United States Patent
Gutman et al.

(10) Patent No.: US 11,445,518 B2
(45) Date of Patent: Sep. 13, 2022

(54) METHODS AND APPARATUS FOR ADAPTIVE WHITENING

(71) Applicant: QUALCOMM Incorporated, San Diego, CA (US)

(72) Inventors: Igor Gutman, Ramat Gan (IL); Guy Wolf, Rosh Haayin (IL); Shay Landis, Hod Hasharon (IL); Gideon Kutz, Ramat Hasharon (IL); Sharon Levy, Binyamina (IL); Yehonatan Dallal, Kfar Saba (IL)

(73) Assignee: QUALCOMM INCORPORATED, San Diego, CA (US)

(*) Notice: Subject to any disclaimer, the term of this patent is extended or adjusted under 35 U.S.C. 154(b) by 32 days.

(21) Appl. No.: 17/103,418

(22) Filed: Nov. 24, 2020

(65) Prior Publication Data

US 2021/0160886 A1 May 27, 2021

Related U.S. Application Data

(60) Provisional application No. 62/940,172, filed on Nov. 25, 2019.

(51) Int. Cl.
*H04W 72/08* (2009.01)
*H04L 5/00* (2006.01)

(52) U.S. Cl.
CPC ......... *H04W 72/082* (2013.01); *H04L 5/0032* (2013.01); *H04L 5/0051* (2013.01)

(58) Field of Classification Search
CPC ... H04B 1/7097; H04B 17/345; H04L 5/0032; H04L 5/0051; H04L 5/0073; H04L 25/03993; H04W 72/082
See application file for complete search history.

(56) References Cited

U.S. PATENT DOCUMENTS

2012/0327795 A1   12/2012  Mallik et al.
2013/0107805 A1*  5/2013   Luo .................. H04L 25/03891
                                          370/328

(Continued)

FOREIGN PATENT DOCUMENTS

EP      3047587 A1    7/2016

OTHER PUBLICATIONS

International Search Report and Written Opinion—PCT/US2020/062412—ISA/EPO—dated Mar. 1, 2021.

*Primary Examiner* — Pao Sinkantarakorn
(74) *Attorney, Agent, or Firm* — Procopio, Cory, Hargreaves & Savitch

(57) ABSTRACT

Aspects are provided which allow a UE to apply a modified interference cleaning data to account for differences in interference between at least one pilot resource and at least one data resource, thereby improving data decoding performance of the UE. The UE receives at least one pilot resource and at least one data resources from a base station and identifies interference cleaning data based on the pilot resource. The UE then determines whether a first interference affecting the pilot resource is the same as a second interference affecting the data resource. When the first interference is the same as the second interference, the UE applies the interference cleaning data to the data resource. Otherwise, when the first interference is different than the second interference, the apparatus applies a modified interference cleaning data to the data resource.

26 Claims, 10 Drawing Sheets

(56) References Cited

U.S. PATENT DOCUMENTS

| | | | |
|---|---|---|---|
| 2014/0133587 A1* | 5/2014 | Yu | H04L 25/0204 |
| | | | 375/260 |
| 2015/0078303 A1* | 3/2015 | Jongren | H04W 52/243 |
| | | | 370/329 |
| 2015/0098440 A1* | 4/2015 | Yang | H04L 5/0007 |
| | | | 370/330 |
| 2017/0099164 A1* | 4/2017 | Jiang | H04L 25/022 |
| 2018/0070365 A1 | 3/2018 | Je et al. | |

* cited by examiner

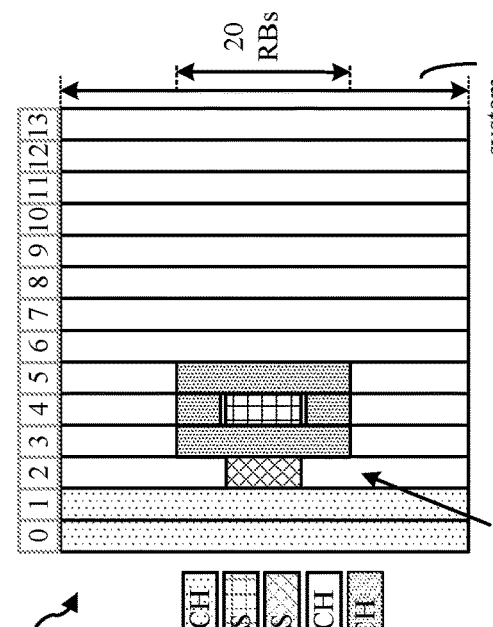
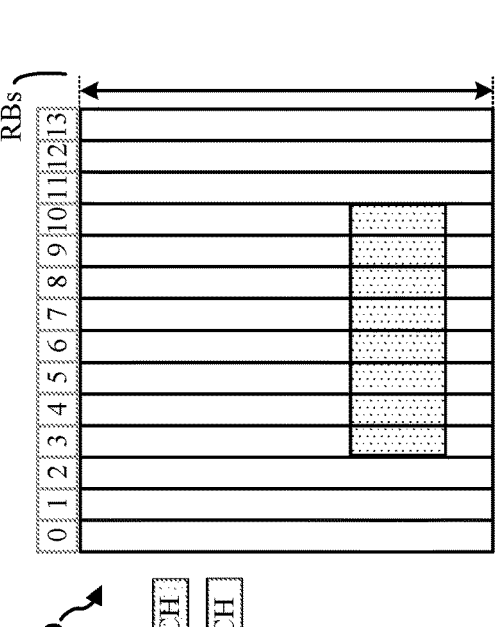
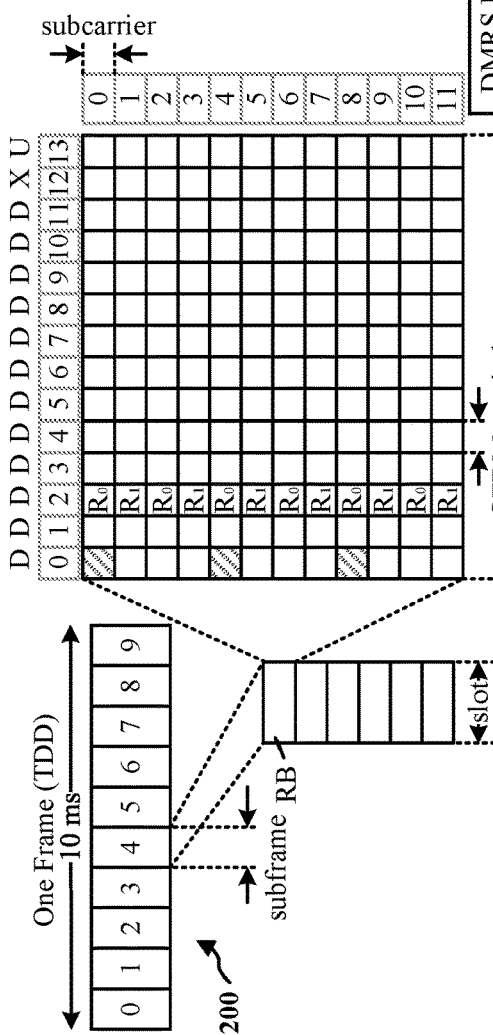
FIG. 2A
FIG. 2B
FIG. 2C
FIG. 2D

METHODS AND APPARATUS FOR ADAPTIVE WHITENING

CROSS REFERENCE TO RELATED APPLICATIONS

This application claims the benefit of U.S. Provisional Application Ser. No. 62/940,172, entitled "ADAPTIVE WHITENING" and filed on Nov. 25, 2019, which is expressly incorporated by reference herein in its entirety.

BACKGROUND

Technical Field

The present disclosure relates generally to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a base station transmits a signal to a UE, thermal noise and interference may affect the signal before the signal is eventually received by the UE. Therefore, before the UE demodulates the received symbols on each subcarrier (e.g., before the UE performs demapping of the received signal), the UE generally performs a whitening process to the received signal by applying interference cleaning data or a whitening transform to mitigate the noise and interference. Generally, the estimation of the whitening transform is based on pilots and applied to data, and the estimated whitening transform from the pilot may be accurate for use in whitening data when the pilot and data share the same interference characteristics (e.g., when both signals are similarly affected or unaffected by a same level of interference by a neighboring base station). For example, when a serving and neighboring base station perform slot-based scheduling by allocating their pilots and data in the same frequency-time resources of a slot, interference may be minimized and the estimated whitening transform for the pilot may accurately correspond to the received data.

However, in circumstances where slot-based scheduling is not used by serving and/or neighboring base station(s), the whitening transform estimated from a pilot may be incorrect for applying to data since the interference affecting the signals may be different. For example, if a neighboring (interfering) base station and a serving (victim) base station in adjacent cells periodically schedule their respective pilots and/or data in different time-frequency resources across multiple slots, a pilot of the interfering base station may coincide in time with the data of the victim base station. In such case, the data of the victim base station may be affected by interference from the interfering base station, while the pilot of the victim base station may be unaffected by interference from the interfering base station. As a result, applying an estimated whitening transform from the pilot to whiten the data may not fully account for the additional interference affecting the data, thereby significantly reducing signal decoding performance.

To prevent the application of erroneous whitening transforms in such situations, such as where victim and interfering base station(s) do not perform slot-based scheduling, the present disclosure allows a UE to apply a modified whitening transform to account for differences in interference between pilots and data. The UE may apply the modified whitening transform based on a determination that the interference affecting the pilot is different than the interference affecting data. If the UE determines that the interference affecting the pilot is the same as the interference affecting the data, the UE may apply the original whitening transform for the pilot to whiten the data. Otherwise, if the UE determines that the interference affecting a pilot is different than the interference affecting the data, the UE may modify the whitening transform to account for the interference. Therefore, PDSCH decoding performance of the UE may be improved.

In an aspect of the disclosure, a method, a computer-readable medium, and an apparatus are provided. The apparatus may be a UE. The apparatus may receive at least one pilot resource and at least one data resource from a base station. The apparatus may also identify interference cleaning data for the at least one pilot resource. The apparatus may also determine whether a first interference affecting the at least one pilot resource is the same as a second interference affecting the at least one data resource. The apparatus may also apply the interference cleaning data to the at least one data resource when the first interference is the same as the second interference. The apparatus may also apply a modified interference cleaning data to the at least one data resource when the first interference is different than the second interference.

In another aspect of the disclosure, a method, a computer-readable medium, and an apparatus are provided. The apparatus may be a base station. The apparatus may receive at least one pilot resource and at least one data resource from a base station. The apparatus may also identify interference cleaning data for the at least one pilot resource. The apparatus may also determine whether a first interference affecting the at least one pilot resource is the same as a second interference affecting the at least one data resource. The apparatus may also apply the interference cleaning data to the at least one data resource when the first interference is the same as the second interference. The apparatus may also apply a modified interference cleaning data to the at least one data resource when the first interference is different than the second interference.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
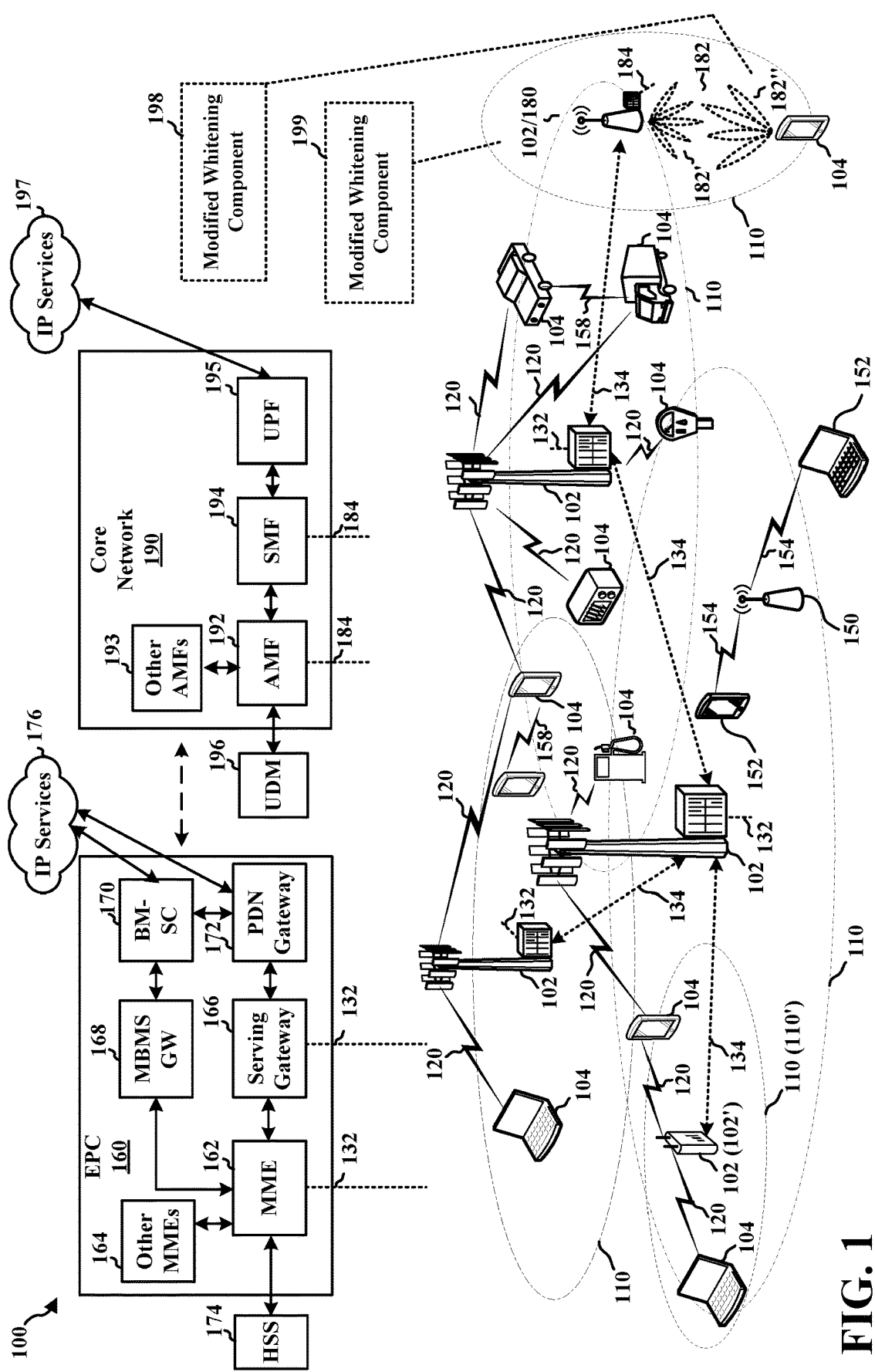
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a modified whitening component 198 that is configured to receive at least one pilot resource and at least one data resource from a base station; identify interference cleaning data for the at least one pilot resource; determine whether a first interference affecting the at least one pilot resource is the same as a second interference affecting the at least one data resource; apply the interference cleaning data to the at least one data resource when the first interference is the same as the second interference; and apply a modified interference cleaning data to the at least one data resource when the first interference is different than the second interference.

Referring again to FIG. 1, in certain aspects, the base station 102/180 may include a modified whitening component 199 that is configured to receive at least one pilot resource and at least one data resource from a base station; identify interference cleaning data for the at least one pilot resource; determine whether a first interference affecting the at least one pilot resource is the same as a second interference affecting the at least one data resource; apply the interference cleaning data to the at least one data resource when the first interference is the same as the second interference; and apply a modified interference cleaning data to the at least one data resource when the first interference is different than the second interference.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
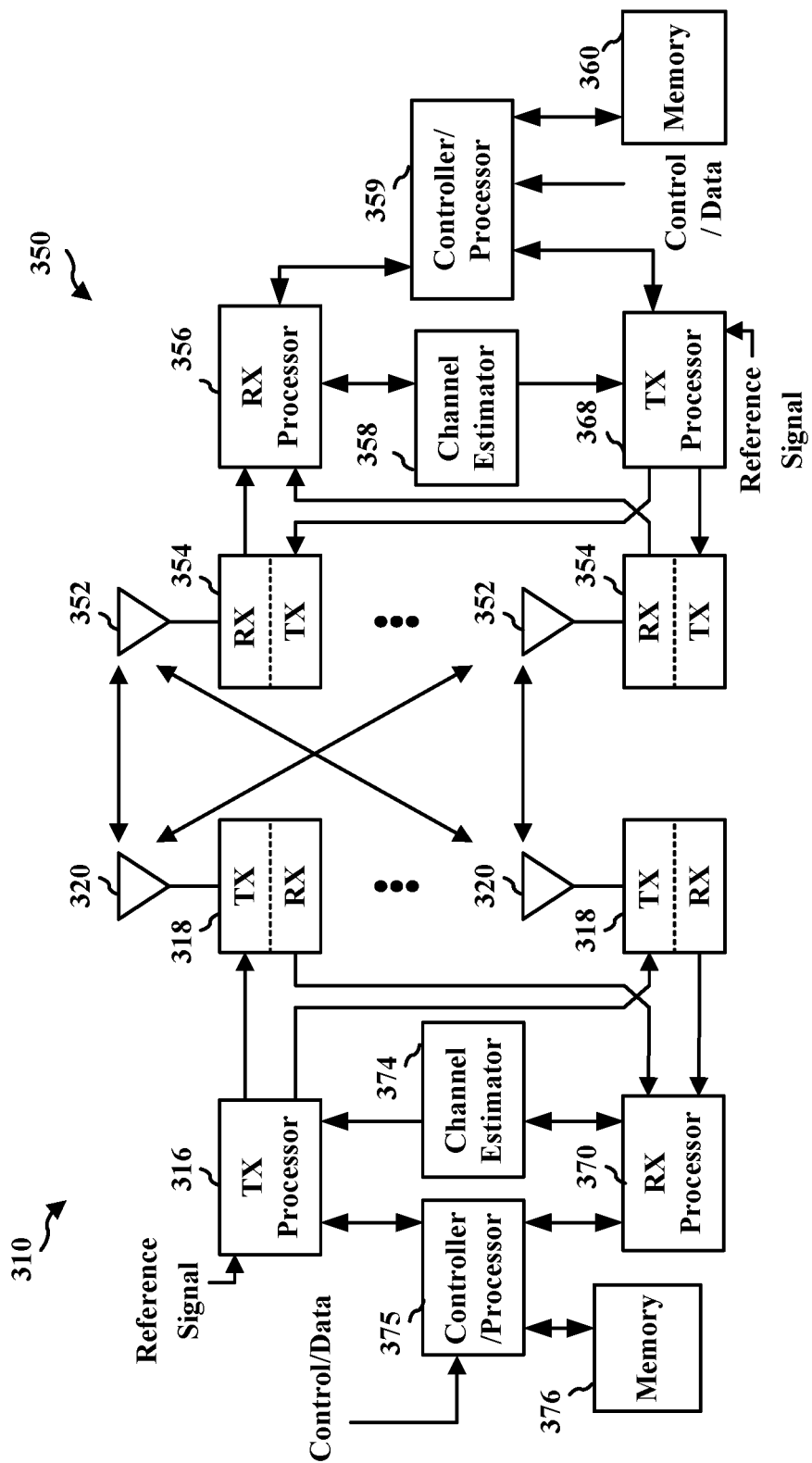
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

When a base station transmits a signal to a UE, thermal noise and interference may affect the signal before the signal is eventually received by the UE. For example, noise may be added to the signal due to nearby electrical equipment, and interference may be caused by a simultaneous transmission from a nearby base station or UE. Therefore, before the UE demodulates the received symbols on each subcarrier (e.g., before the UE performs demapping of the received signal), the UE generally performs a whitening process to the received signal to mitigate the noise and interference for optimal decoding performance.

For example, prior to performing whitening, the UE may obtain a pre-whitening reception (RX) signal $$Y_{pre}^{r \in 1 \ldots numRxAnt}$$

in the frequency domain, over a predefined number of UE reception antennae numRxAnt. The pre-whitening signal may be expressed as:

$$Y_{pre}^{r \in 1 \ldots numRxAnt} = H \cdot P \cdot X + \underbrace{N + I}_{D} \qquad (1)$$

where X represents the received signal, H is the channel matrix which the UE applies to the received signal, P is the precoding matrix which the UE applies to the received signal, N resents the thermal noise affecting the received signal, I represents the interference affecting the received signal, and D represents the sum of N and I. Equation (1) assumes that the expected value of D is not equal to the identity matrix I (e.g., $E(D \cdot D^H) \neq I$).

After identifying the pre-whitening signal $Y_{pre}$, the UE may apply a whitening transform (matrix) W to the pre-whitening signal to obtain a post-whitening signal $Y_{post}$ in the frequency domain. The post-whitening signal may thus be expressed as:

$$\begin{aligned} Y_{post} &= W \cdot Y_{pre} \qquad (2) \\ &= W \cdot (H \cdot P \cdot X + D) \\ &= W \cdot H \cdot P \cdot X + W \cdot D \end{aligned}$$

where Equation (2) assumes that the expected value of the product of W and D is equal to the identity matrix I (e.g., $E(W \cdot D \cdot (W \cdot D)^H) = I$). Thus, the estimation of W should be performed with high accuracy, since if W is erroneously estimated, the noise and interference represented by D may be enhanced, significantly impacting decoding performance. After the UE performs the whitening process, the UE may perform demapping of $Y_{post}$ and proceed to decode the received signal from the base station.

Figure 4:
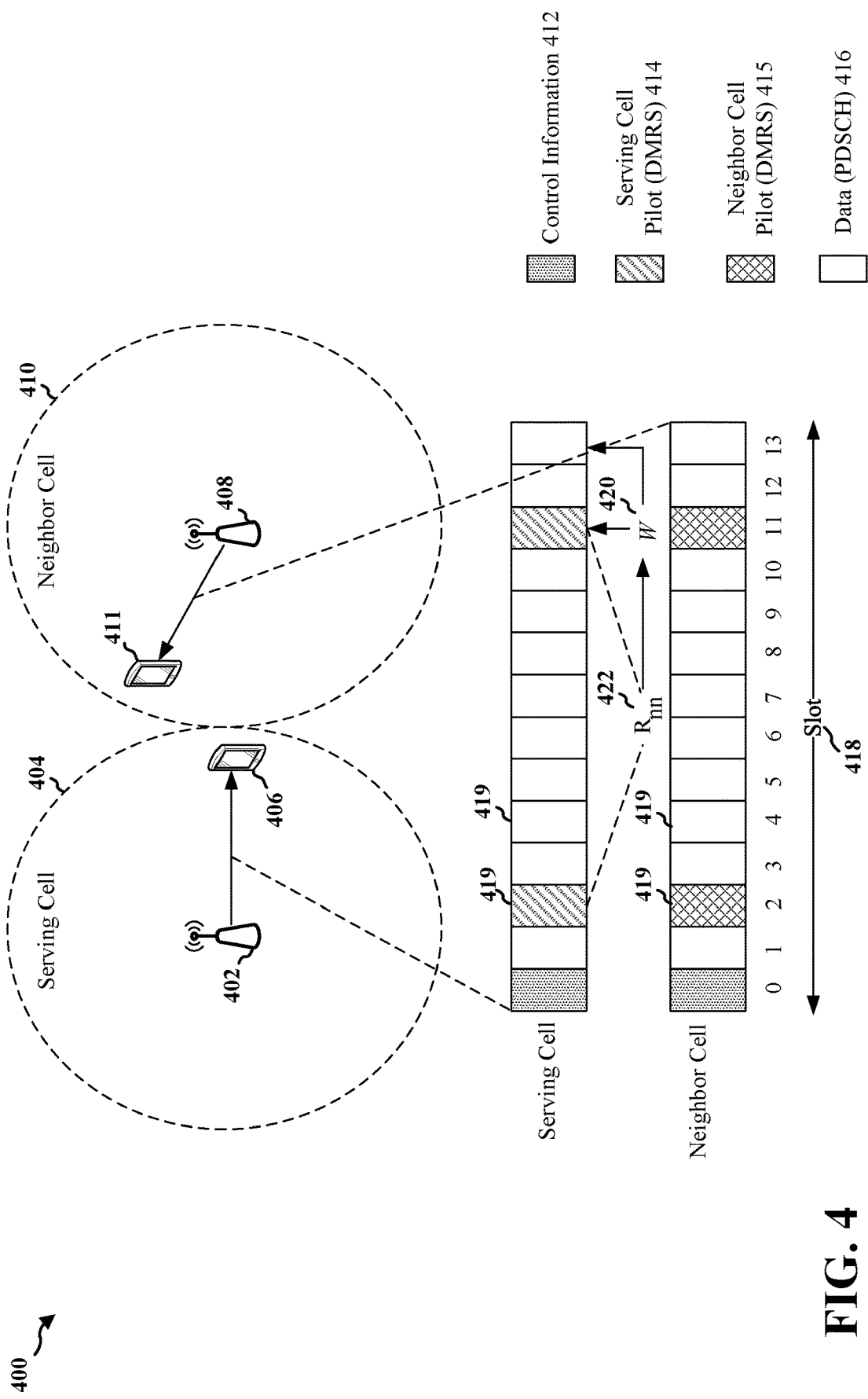
FIG. 4 is a diagram illustrating an example of information received from one or more base stations performing slot-based scheduling.

Generally, the estimation of the whitening transform is based on pilots and applied to data. For instance, when the UE receives from a serving base station a reference signal such as DMRS, the UE may identify the whitening transform W by estimating a noise covariance matrix $R_{nn}$ from the reference signal. The UE may then invert the noise covariance matrix $R_{nn}$ to identify W, and apply the estimated W to whiten a data signal received on PDSCH. The estimated whitening transform from the pilot may be accurate for use in whitening data when the pilot and data share the same interference characteristics (e.g., when both signals are similarly affected or unaffected by a same level of interference by a neighboring base station). For example, when the serving and neighboring base station(s) perform slot-based scheduling by allocating their pilots and data in the same frequency-time resources of a slot, interference may be minimized and the estimated W for the pilot may accurately correspond to data. An example where slot-based scheduling is used is shown in FIG. 4.

However, in circumstances where slot-based scheduling is not used by serving and/or neighboring base station(s) (for example, base stations supporting URLLC), the whitening transform estimated from a pilot may be incorrect for applying to data since the interference affecting the signals may be different and thus the estimated W may be mismatched. For example, if a neighboring (interfering) base station and a serving (victim) base station in adjacent cells periodically schedule their respective pilots and/or data in different time-frequency resources across multiple slots, a pilot of the interfering base station may coincide in time with the data of the victim base station. In such a case, the data of the victim base station may be affected by interference from the interfering base station, while the pilot of the victim base station may be unaffected by interference from the interfering base station. As a result, applying an estimated whitening transform from the pilot to whiten the data may not fully account for the additional interference affecting the data, thereby significantly reducing signal decoding performance.

Figure 5:
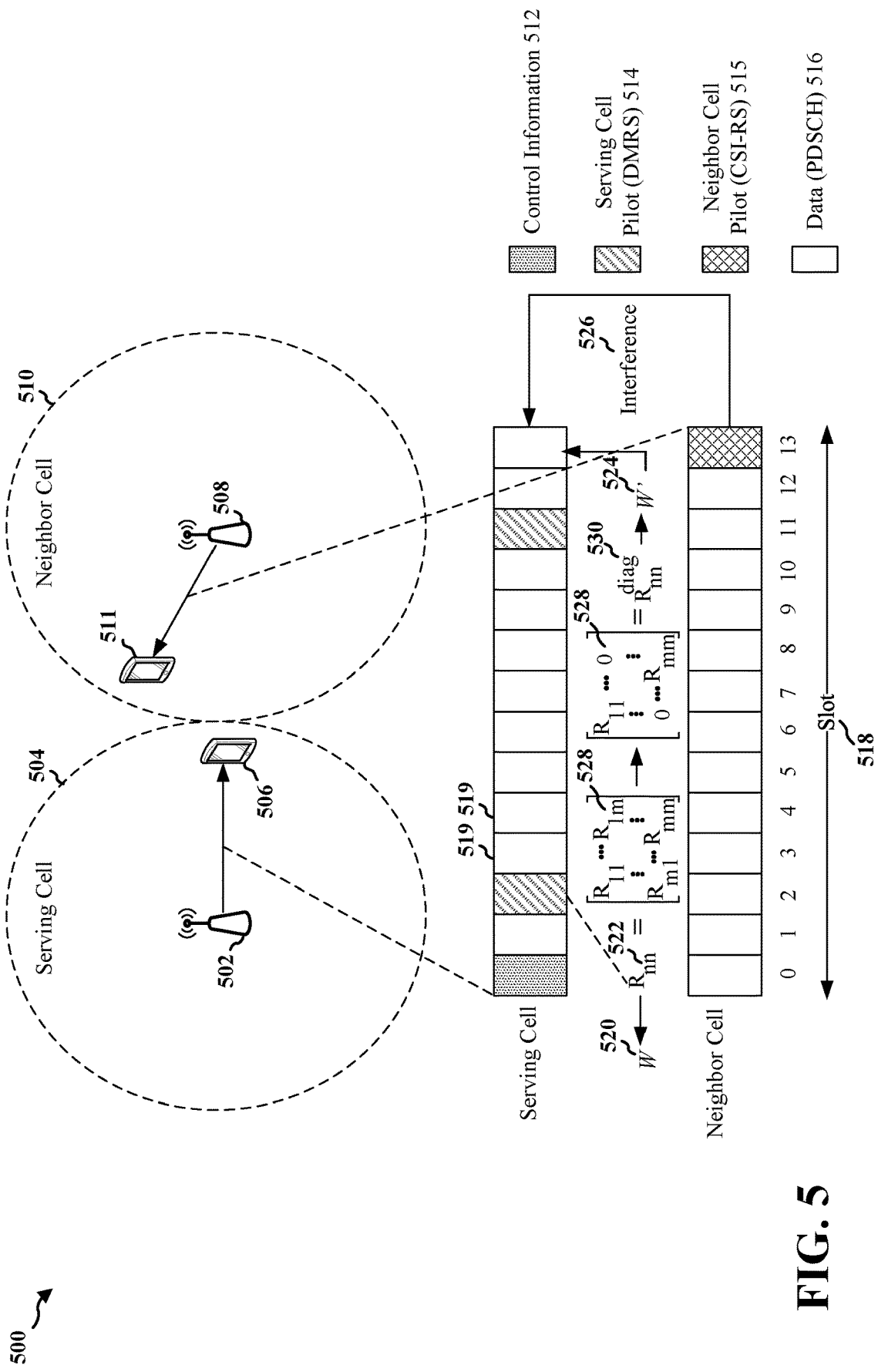
FIG. 5 is a diagram illustrating an example of information received from one or more base stations that do not perform slot-based scheduling (e.g., non-slot-based scheduling).

Therefore, to prevent the application of erroneous whitening transforms in such situations, e.g., where victim and interfering base station(s) do not perform slot-based scheduling such as illustrated in FIG. 5, the present disclosure allows a UE to apply a modified whitening transform W' to account for differences in interference between pilots and data. The UE may apply the modified whitening transform W' based on a determination that the interference affecting the pilot (e.g., DMRS) is different than the interference affecting data (e.g., on PDSCH). For example, the UE may estimate a transmission power of the DMRS and data carried on one or more symbols of a PDSCH, and determine whether the difference in transmission power is greater than a threshold power. Such power difference may indicate that the DMRS is affected by interference while the data is not, or vice-versa, since the base station may transmit a signal with greater power to compensate for the interference.

If the UE determines that the interference affecting the pilot is the same as the interference affecting the data (e.g., the difference in transmission power is less than the threshold power), the UE may apply the original whitening transform W to whiten the data. Otherwise, if the UE determines that the interference affecting a pilot is different than the interference affecting the data (e.g., the difference in transmission power is greater than the threshold power), the UE may modify the whitening transform W to account for the interference. For example, the UE may null the off-diagonal elements of W, thereby transforming W into a diagonal matrix W', and apply the modified matrix to whiten the data. Since the off-diagonal elements which generally represent significantly high energy elements are zeroed out, enhancement of thermal noise and interference (D) affecting the data may be avoided due to accurate estimation of W. Therefore, PDSCH decoding performance of the UE may be improved.

FIG. 4 is an example diagram 400 of information received from one or more base stations performing slot-based scheduling. The diagram 400 depicts a base station 402 in a serving cell 404 that serves a UE 406, and a base station 408 in a neighbor cell 410 that serves other UEs such as UE 411. The base stations 402, 408 respectively transmit control information 412 (e.g., one or more control resource sets (CORESETS)), pilots 414, 415 (e.g., DMRS, CSI-RS, etc.), and data 416 (e.g., on a PDSCH) in one or more slots 418 to the UEs 406, 411. In this example, the base stations 402, 408 may schedule their transmissions of pilots 414 and data 416 to be within the same symbols 419 of a slot 418. For instance, base stations 402, 408 may each periodically transmit DMRS in symbols 2 and 11 (or other common symbols) within the same slot 418.

When the UE 406 within serving cell 404 receives one or more pilots 414 from the base station 402, the UE determines a whitening transform W 420 based on the pilots prior to performing demapping and decoding of the pilots 414 as described above. For example, the UE may estimate a noise covariance matrix $R_{nn}$ 422 from the DMRS received in either symbols 2 or 11, and calculate the inverse of $R_{nn}$ 422 to identify the whitening transform W 420. The UE 406 may then apply the whitening transform on the received pilots and demap and decode the whitened signal, and subsequently perform channel estimation or perform other processing based on the pilots 414.

Moreover, when the UE 406 within serving cell 404 receives data 416 from the base station 402, the UE 406 determines whether to also apply the estimated whitening transform W 420 or to instead apply a modified whitening transform W' to the data 416 before performing demapping and decoding of the data. In particular, the UE 406 determines whether any interference affecting the pilots 414 is the same as any interference affecting the data 416, applies the estimated whitening transform W 420 to the data if the interferences are the same, or applies the modified whitening transform W' to the data if the interferences are different. For example, the UE 406 may measure a reception (Rx) power of the data 416, compare it to a reference signal receive power (RSRP) of the pilots 414, and determine that the interferences are the same if the difference between the Rx power and the RSRP is less than a predefined threshold power (e.g., 3 dB or another number). Similarly, the UE may determine that the interferences are different if the difference between the Rx power and the RSRP is greater than the threshold power.

In this example, since the base station 408 in the neighbor cell 410 schedules pilots 415 in common symbols 419 of the same slot 418 in the example diagram 400, the pilots 415 of base station 408 may not interfere with the data 416 of base station 402, and therefore the base station 402 may transmit its data 416 using the same transmission power as its pilots 414. Accordingly, the UE 406 may determine that the difference in power between the pilots 414 and data 416 is less than the threshold power, and therefore that the interference characteristics of the pilots 414 and data 416 are the same. As a result, the UE 406 may apply the previously identified whitening transform W 420 to the data 416 in order to successfully demap and decode the data. For instance, FIG. 4 illustrates the UE 406 applying the whitening transform W 420 to the last symbol 13 of the PDSCH (as well as the pilot 414).

FIG. 5 is an example diagram 500 of information received from one or more base stations performing non-slot-based scheduling. As in FIG. 4, the diagram 500 in FIG. 5 depicts a base station 502 in a serving cell 504 that transmits control information 512, pilots 514 (e.g., DMRS, etc.), and data 516 (e.g., on PDSCH) to a UE 506. Similarly, FIG. 5 illustrates a base station 508 in a neighbor cell 510 that transmits pilots 515 (e.g., CSI-RS, phase tracking reference signal (PTRS), etc.) to other UEs such as UE 511. The base stations may respectively transmit their signals in one or more slots 518 to the UEs 506, 511. However, unlike FIG. 4 in this example, the base stations 502, 508 may schedule their transmissions of pilots 514, 515 and data 516 to be within different symbols 519 of the slot 518. For instance, capacity demand by UEs for the base station 508 in the neighbor cell 510 may be low, and so while base station 502 in serving cell 504 may periodically transmit DMRS in symbols 2 and 11 within the slot 518, base station 508 may periodically transmit CSI-RS (or PTRS or another pilot) in symbol 13 or another different symbol within the same slot 518.

When the UE 506 within serving cell 504 receives pilots 514 from the base station 502, the UE 506 may determine a whitening transform W 520 based on the pilots prior to performing demapping and decoding of the pilots as described above. For example, the UE may estimate a noise covariance matrix $R_{nn}$ 522 from the DMRS received in either symbols 2 or 11, and calculate the inverse of $R_{nn}$ to identify the whitening transform W 520. The UE 506 may then apply the whitening transform on the received pilots and demap and decode the whitened signal, and subsequently perform channel estimation or perform other processing based on the pilots 514.

Similarly, when the UE 506 within serving cell 504 receives data 516 from the base station 502, the UE 506 determines whether to apply the estimated whitening transform W 520 or a modified whitening transform W' 524 to the data 516 before performing demapping and decoding of the data. In particular, the UE 506 determines whether any interference affecting the pilots 514 is the same as any interference affecting the data 516, applies the estimated whitening transform W 520 to the data if the interferences are the same, or applies the modified whitening transform W' 524 to the data if the interferences are different. In this example, since the base stations 502, 508 schedule their pilots 514, 515 in different symbol(s) of the same slot 518, the pilot 515 of base station 508 may interfere with the data 516 of base station 502, and therefore the base station 502 may transmit its data 516 using a significantly greater transmission power than one or more of its pilots 514. For instance, in the example diagram 500, the CSI-RS received from base station 508 in the last symbol 13 of the slot may provide interference 526 to the data 516 received from base station 502 in that symbol. Accordingly, the UE 506 may determine that the difference in power between the pilots 514 and the data 516 in the last symbol is greater than the threshold power, and therefore that the interference characteristics of the pilots 514 and data 516 may be different.

As a result, to account for the difference in interference (e.g., as caused by interference 526), the UE 506 nulls the off-diagonal elements 528 of the noise covariance matrix $R_{nn}$ 522 estimated from the pilot 514 in order to obtain a diagonal noise covariance matrix $R_{nn}^{diag}$ 530. For example, FIG. 5 illustrates the estimated noise covariance matrix $R_{nn}$ from the DMRS including various elements $R_{11}$ through $R_{mm}$, where m represents the number of UE antennae. The UE zeroes out the off-diagonal elements 528 to form the diagonal matrix $R_{nn}^{diag}$ 530 and inverts the diagonal matrix $R_{nn}^{diag}$ to result in the modified whitening transform W' 524. The UE 506 consequently applies this modified whitening transform W' to the data to successfully demap the data 516. Since application of the modified whitening transform W' 524 avoids the enhancement of thermal noise and interference which may otherwise result from erroneous application of the whitening transform W 520, the UE 506 may be able to decode the data with increased performance, including lower rank data with high modulation and coding scheme (MCS) in high signal-to-noise ratio (SNR) environments.

Figure 6:
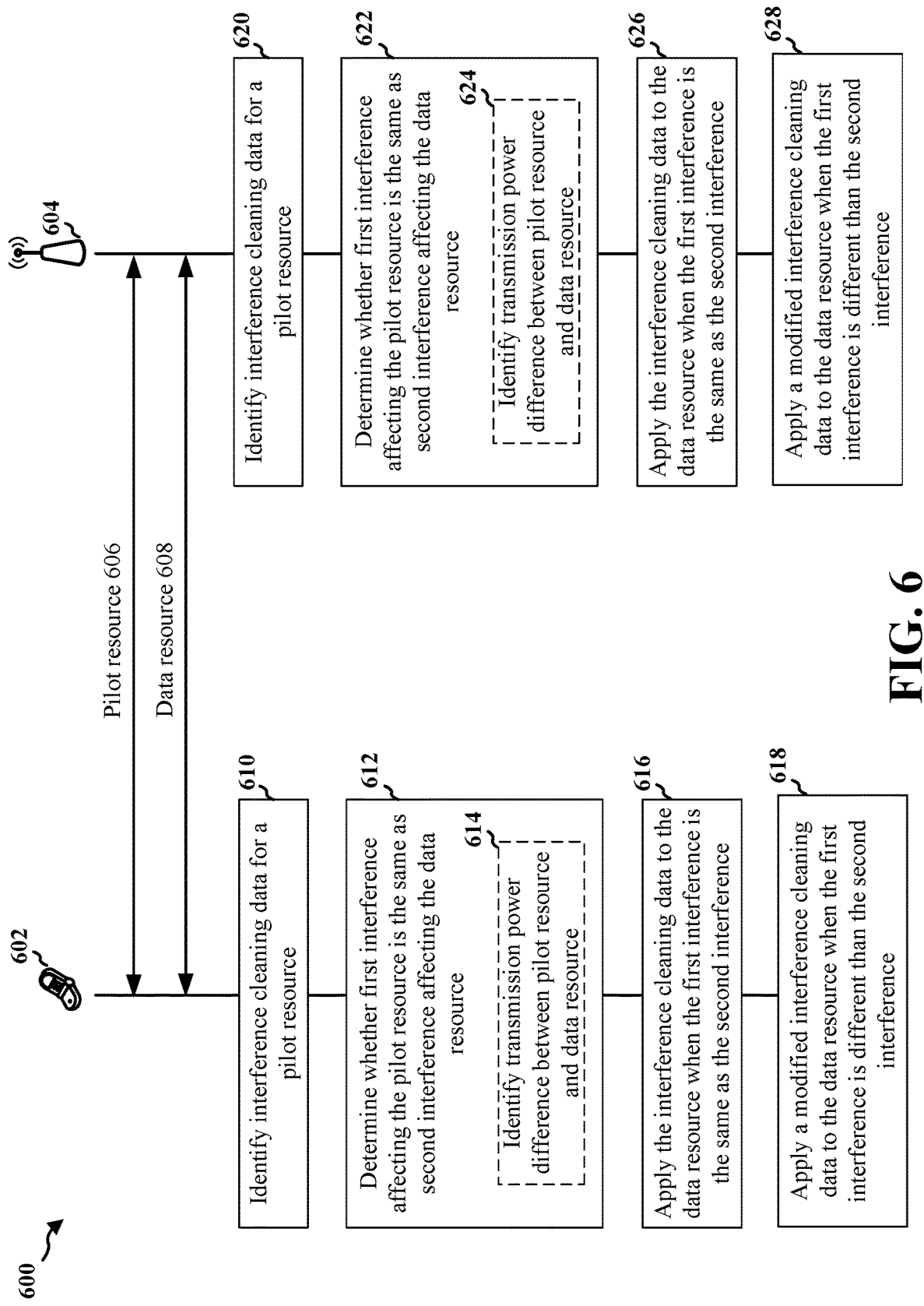
FIG. 6 is a diagram illustrating an example call flow between a UE and a base station.

FIG. 6 illustrates a call flow diagram 600 between a UE 602 and a base station 604. UE 602 may correspond to UE 104, 406, and 506, and base station 604 may correspond to base station 102, 402, and 502. The diagram 600 illustrates the aforementioned examples of FIGS. 4 and 5 in which the UE 602 may determine whether to apply interference cleaning data, e.g., a whitening transform matrix, or a modified interference cleaning data, e.g., a modified whitening transform matrix, to a data resource received from base station 604.

The UE 602 may receive at least one pilot resource 606 from the base station 604. Likewise, the base station 604 may receive at least one pilot resource 606 from the UE 602. The pilot resource may be a DMRS, for example. For instance, referring to FIGS. 4 and 5, the UE may receive pilots 414, 514 from the base station in the serving cell 404, 504 in one or more slots 418, 518.

The UE 602 also may receive at least one data resource 608 from the base station 604. Likewise, the base station 604 may receive at least one data resource 608 from the UE 602. The data may be carried on PDSCH, for example. For instance, referring to FIGS. 4 and 5, the UE may receive data 416, 516 from the base station in the serving cell 404, 504 within the slot 418, 518. While FIG. 6 illustrates that the data resource 608 is received after the pilot resource 606 is received and the interference cleaning data is identified at block 610, the data resource 608 may be received at other times (e.g., before the pilot resource 606 is received or the interference cleaning data is identified).

After receiving the pilot resource 606, at block 610, the UE identifies interference cleaning data for the pilot resource 606. For example, referring to FIGS. 4 and 5, the UE may determine a whitening transform W 420, 520 based on the pilots prior to performing demapping and decoding of the pilots 414, 514 as described above. For example, the UE may estimate a noise covariance matrix $R_{nn}$ 422, 522 from the received DMRS and calculate the inverse of $R_{nn}$ 422, 522 to identify the whitening transform W 420, 520.

After receiving the data resource 608, at block 612, the UE determines whether the interference affecting the pilot resource 606 is the same as the interference affecting the data resource 608. For example, at block 614, the UE may identify the difference in transmission power between the pilot resource 606 and the data resource 608 in order to determine whether the interferences are the same. Such power difference may indicate that the pilot resource 606 is affected by interference while the data resource 608 is not, or vice-versa, since the base station 604 may transmit a signal with greater power to compensate for interference from a neighboring base station. For instance, referring to FIGS. 4 and 5, the UE may measure a reception (Rx) power of the data 416, 516, compare it to a reference signal receive power (RSRP) of the pilots 414, 514, and determine that the interferences are the same if the difference between the Rx power and the RSRP is less than a predefined threshold power. Similarly, the UE may determine that the interferences are different if the difference between the Rx power and the RSRP is greater than the threshold power.

Finally, at blocks 616 and 618, the UE applies either the identified interference cleaning data at block 610 or a modified interference cleaning data to the data resource 608 based on the determination at block 612. For instance, at block 616, the UE may apply the interference cleaning data to the at least one data resource when the first interference is the same as the second interference. At block 618, the UE may apply modified interference cleaning data to the at least one data resource when the first interference is different than the second interference. Referring to FIGS. 4 and 5, if the UE determines that interference (or the lack thereof) affecting the pilots 414, 514 is the same as interference (or the lack thereof) affecting the data 416, 516, the UE applies the estimated whitening transform W 420, 520 to the data; otherwise, the UE applies the modified whitening transform W' 524 to the data. For instance, in the example of FIG. 4, the UE may determine that the difference in power between the pilots 414 and data 416 is less than a predefined threshold power, and therefore that the interference characteristics (e.g., the noise covariance matrix $R_{nn}$ 422) of the pilots 414 and data 416 are the same. As a result, the UE may apply the previously identified whitening transform W 420 to the data 416 in order to successfully demap and decode the data. Alternatively, as in the example of FIG. 5, the UE may determine that the difference in power between the pilots 514 and the data 516 is greater than the threshold power, and therefore that the interference characteristics of the pilots 514 and data 516 may be different. As a result, the UE may null the off-diagonal elements 528 of the noise covariance matrix $R_{nn}$ 522 estimated from the pilot 514 in order to obtain a diagonal noise covariance matrix $R_{nn}^{diag}$ 530, invert the diagonal matrix $R_{nn}^{diag}$ to result in the modified whitening transform W' 524, and apply this modified whitening transform W' to the data to successfully demap the data 516.

In some aspects, the base station 604 may receive at least one pilot resource 606 and/or at least one data resource 608 from UE 602.

At block 620, the base station 604 may identify interference cleaning data for the at least one pilot resource 606. In some aspects, the interference cleaning data may be a whitening transform matrix.

At block 622, the base station 604 may determine whether a first interference affecting the at least one pilot resource is the same as a second interference affecting the at least one data resource. In some aspects, when determining whether a first interference affecting the at least one pilot resource is the same as a second interference affecting the at least one data resource, at block 624, the base station 604 may identify a transmission power difference between the at least one pilot resource and the at least one data resource. The interference cleaning data may be applied to the at least one data resource when the transmission power difference is less than a threshold power. The modified interference cleaning data may be applied to the at least one data resource when the transmission power difference is greater than the threshold power.

At block 626, the base station 604 may apply the interference cleaning data to the at least one data resource when the first interference is the same as the second interference.

At block 628, the base station 604 may apply modified interference cleaning data to the at least one data resource when the first interference is different than the second interference.

In some aspects, the modified interference cleaning data may comprise a diagonal matrix, and the modified interference cleaning data may be identified by nulling off-diagonal elements of a noise covariance matrix from which the interference cleaning data is identified, where the noise covariance matrix may be estimated from the at least one pilot resource.

Additionally, the at least one pilot resource may comprise a demodulation reference signal (DMRS). The modified interference cleaning data may comprise a matrix resulting from an inverse of $R_{nn}^{diag}$, where $R_{nn}^{diag}$ is a result of zeroing off-diagonal elements of a $R_{nn}$ matrix. Further, the $R_{nn}$ matrix may be a noise covariance matrix estimated from the DMRS.

In some instances, the at least one data resource may comprise information on a physical downlink shared channel (PDSCH) or a physical uplink shared channel (PUSCH). Also, the UE and/or the base station may be in a serving cell, and the first interference and the second interference may be from a neighbor cell. The at least one pilot resource may comprise a first pilot resource from the serving cell, and the first pilot resource may be received in a different symbol than a second pilot resource from the neighbor cell.

Figure 7:
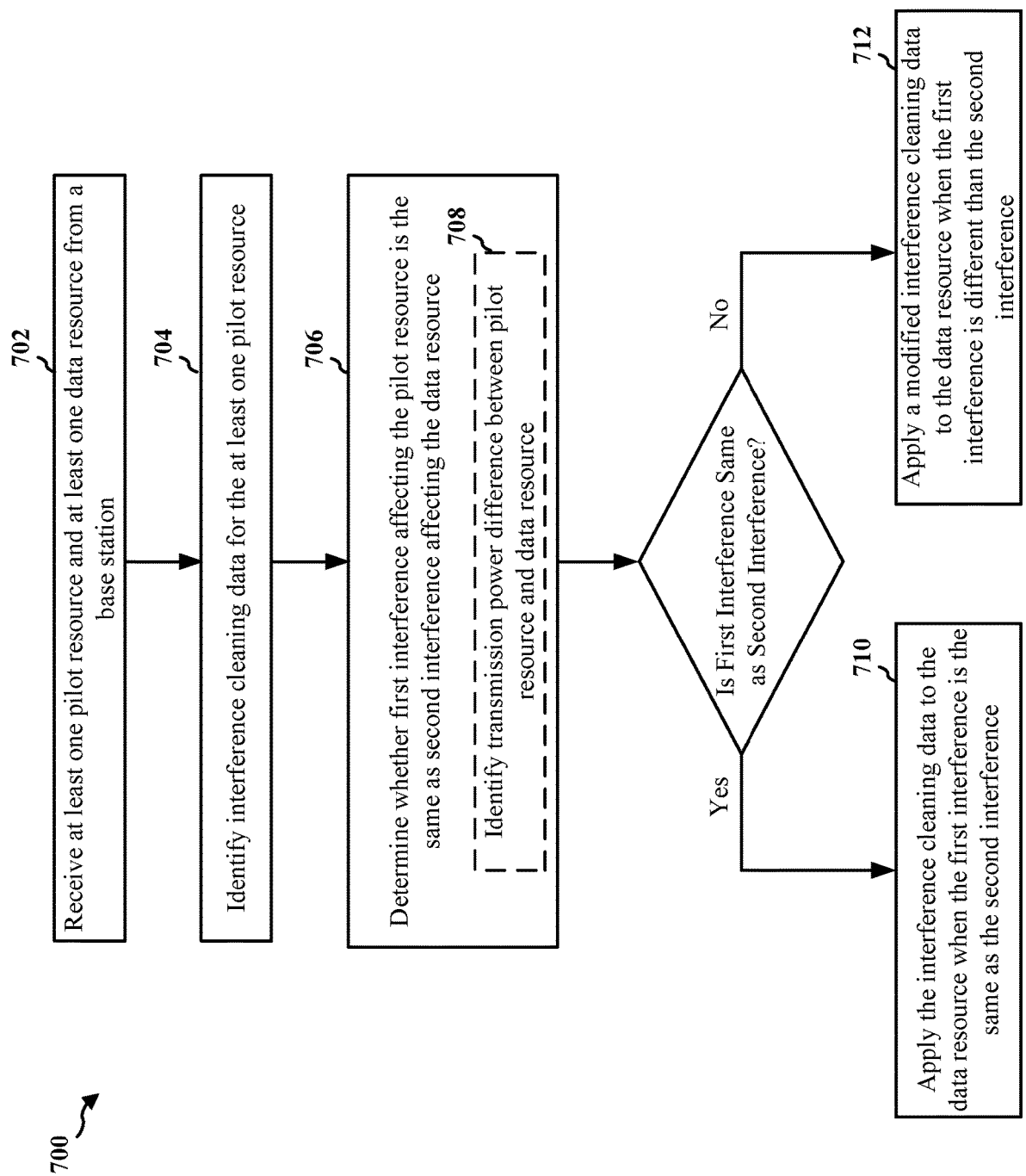
FIG. 7 is a flowchart of a method of wireless communication at a UE.

FIG. 7 is a flowchart 700 of a method of wireless communication. The method may be performed by an apparatus, such as a UE or a component of a UE (e.g., the UE 104, 350, 406, 506, 602; the apparatus 902). The UE may be in communication with a base station (e.g., base station 102/180, 310, 402, 502, 604). Optional aspects are illustrated in dashed lines. The method allows a UE to improve data decoding performance by applying a modified interference cleaning data when interference affecting a pilot resource is different than interference affecting a data resource received from a base station.

At 702, the UE receives at least one pilot resource and at least one data resource from a base station. For example, 702 may be performed by determination component 940 from FIG. 9. The pilot resource may comprise a demodulation reference signal (DMRS), and the data resource may comprise information on a physical downlink shared channel (PDSCH). The base station may be in a serving cell. For example, referring to FIG. 6, the UE may receive a pilot resource 606 and data resource 608 from a base station 604. The pilot resource 606 may be a DMRS and the data resource 608 may be carried on PDSCH, for example. Referring to FIGS. 4 and 5, the base station (e.g., base station 402, 502) may be in a serving cell 404, 504 serving the UE.

At 704, the UE identifies interference cleaning data for the pilot resource. For example, 704 may be performed by determination component 940 from FIG. 9. For example, referring to FIG. 6, at block 610, the UE identifies interference cleaning data for the pilot resource. For example, referring to FIGS. 4 and 5, the UE may determine a whitening transform W 420, 520 based on the pilots 414, 514 prior to performing demapping and decoding of the pilots as described above. For instance, the UE may estimate a noise covariance matrix $R_{nn}$ 422, 522 from the received DMRS and calculate the inverse of $R_{nn}$ 422, 522 to identify the whitening transform W 420, 520. In some aspects, the interference cleaning data may be a whitening transform matrix.

At 706, the UE determines whether a first interference affecting the pilot resource is the same as a second interference affecting the data resource. For example, 706 may be performed by determination component 940 from FIG. 9. For instance, at 708, the UE may identify a transmission power difference between the pilot resource and the data resource, and the UE may determine whether the interferences are the same based on the transmission power difference. For example, 708 may be performed by determination component 940 from FIG. 9. For instance, referring to FIG. 6, at block 612, the UE determines whether the interference affecting the pilot resource 606 is the same as the interference affecting the data resource 608. For example, at block 614, the UE may identify the difference in transmission power between the pilot resource 606 and the data resource 608 in order to determine whether the interferences are the same. Such power difference may indicate that the pilot resource 606 is affected by interference while the data resource 608 is not, or vice-versa, since the base station 604 may transmit a signal with greater power to compensate for interference from a neighboring base station.

The first interference and the second interference may be from a neighbor cell. The pilot resource may comprise a first pilot resource from the serving cell, and the first pilot resource may be received in a different symbol than a second pilot resource from the neighbor cell. For example, referring to FIG. 5, the base stations 502, 508 may schedule their transmissions of pilots 514, 515 and data 516 to be within different symbols 519 of the slot 518. For instance, base station 502 in serving cell 504 may periodically transmit DMRS in symbols 2 and 11 within the slot 518, while base station 508 in neighbor cell 510 may periodically transmit CSI-RS (or PTRS or another pilot) in symbol 13 or another different symbol within the same slot 518. Thus, since the base stations 502, 508 schedule their pilots 514, 515 in different symbol(s) of the same slot 518, the pilot 515 of base station 508 may interfere with the data 516 of base station 502. For instance, the CSI-RS received from base station 508 in the last symbol 13 of the slot may provide interference 526 to the data 516 received from base station 502 in that symbol. Accordingly, the UE 506 may determine that the interference characteristics of the pilots 514 and data 516 may be different (e.g., a first interference affecting the pilot 514 may be less than, or non-existent in comparison to, the second interference 526 affecting the data).

Finally, when the UE determines the first interference is the same as the second interference at 706, then at 710, the UE applies the interference cleaning data (identified at 704) to the data resource. For example, 710 may be performed by determination component 940 from FIG. 9. For instance, the interference cleaning data may be applied to the data resource when the transmission power difference identified at 708 is less than a threshold power. Referring to FIG. 4, if the UE determines that interference (or the lack thereof) affecting the pilots 414 is the same as interference (or the lack thereof) affecting the data 416, the UE applies the estimated whitening transform W 420 to the data. For example, the UE may determine that the difference in power between the pilots 414 and data 416 is less than a predefined threshold power, and therefore that the interference characteristics of the pilots 414 and data 416 are the same. As a result, the UE may apply the previously identified whitening transform W 420 to the data 416 in order to successfully demap and decode the data.

Alternatively, when the UE determines the first interference is different than the second interference at 706, then at 712, the UE applies a modified interference cleaning data to the data resource. For example, 712 may be performed by determination component 940 from FIG. 9. For instance, the modified interference cleaning data may be applied to the data resource when the transmission power difference identified at 712 is greater than the threshold power. Referring to FIG. 5, if the UE determines that interference affecting the pilots 414 is different than the interference affecting the data 416 (e.g., there is greater interference on the data than the pilots or vice-versa), the UE applies the modified whitening transform W' 524 to the data. For example, the UE may determine that the difference in power between the pilots 514 and the data 516 is greater than the threshold power, and therefore that the interference characteristics of the pilots 514 and data 516 may be different. As a result, the UE may apply the modified whitening transform W' to the data to successfully demap the data 516.

The modified interference cleaning data may comprise a diagonal matrix, and the modified interference cleaning data may be identified by nulling off-diagonal elements of a noise covariance matrix from which the interference cleaning data is identified, the noise covariance matrix being estimated from the at least one pilot resource. For instance, the modified interference cleaning data may comprise a matrix resulting from an inverse of $R_{nn}^{diag}$, where $R_{nn}^{diag}$ is a result of zeroing off-diagonal elements of a $R_{nn}$ matrix, and where the $R_{nn}$ matrix is a noise covariance matrix estimated from the DMRS. Referring to FIG. 5, the UE may null the off-diagonal elements 528 of the noise covariance matrix $R_{nn}$ 522 estimated from the pilot 514 (e.g., DMRS) in order to obtain a diagonal noise covariance matrix $R_{nn}^{diag}$ 530, and invert the diagonal matrix $R_{nn}^{diag}$ to identify the modified whitening transform W' 524. The UE may then apply this modified whitening transform W' 524 to the data as described above.

Figure 8:
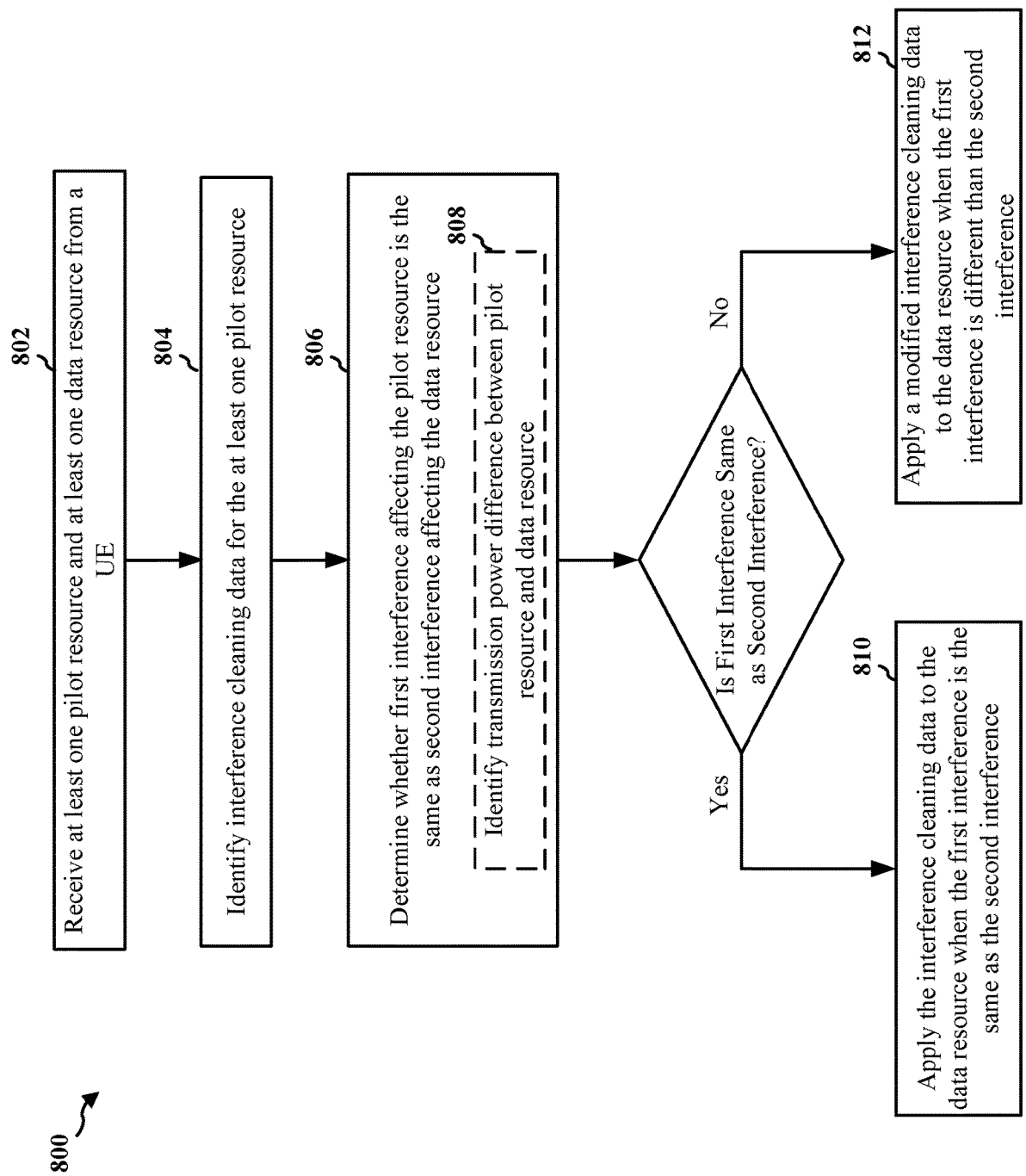
FIG. 8 is a flowchart of a method of wireless communication at a base station.

FIG. 8 is a flowchart 800 of a method of wireless communication. The method may be performed by an apparatus, such as a base station or a component of a base station (e.g., base station 102/180, 310, 402, 502, 604, the apparatus 1002). Optional aspects are illustrated in dashed lines. The method allows a UE and/or a base station to improve data decoding performance by applying a modified interference cleaning data when interference affecting a pilot resource is different than interference affecting a data resource received from a UE and/or a base station.

At 802, the apparatus may receive at least one pilot resource and/or at least one data resource from a UE and/or a base station, as described in connection with the examples in FIGS. 4, 5, and 6. For example, 802 may be performed by determination component 1040 from FIG. 10.

At 804, the apparatus may identify interference cleaning data for the at least one pilot resource, as described in connection with the examples in FIGS. 4, 5, and 6. For example, 804 may be performed by determination component 1040 from FIG. 10. In some aspects, the interference cleaning data may be a whitening transform matrix, as described in connection with the examples in FIGS. 4, 5, and 6.

At 806, the apparatus may determine whether a first interference affecting the at least one pilot resource is the same as a second interference affecting the at least one data resource, as described in connection with the examples in FIGS. 4, 5, and 6. For example, 806 may be performed by determination component 1040 from FIG. 10. In some aspects, at 808, when determining whether a first interference affecting the at least one pilot resource is the same as a second interference affecting the at least one data resource, the apparatus may identify a transmission power difference between the at least one pilot resource and the at least one data resource, as described in connection with the examples in FIGS. 4, 5, and 6. For example, 808 may be performed by determination component 1040 from FIG. 10. The interference cleaning data may be applied to the at least one data resource when the transmission power difference is less than a threshold power, as described in connection with the examples in FIGS. 4, 5, and 6. The modified interference cleaning data may be applied to the at least one data resource when the transmission power difference is greater than the threshold power, as described in connection with the examples in FIGS. 4, 5, and 6.

At 810, the apparatus may apply the interference cleaning data to the at least one data resource when the first interference is the same as the second interference, as described in connection with the examples in FIGS. 4, 5, and 6. For example, 810 may be performed by determination component 1040 from FIG. 10.

At 812, the apparatus may apply modified interference cleaning data to the at least one data resource when the first interference is different than the second interference, as described in connection with the examples in FIGS. 4, 5, and 6. For example, 812 may be performed by determination component 1040 from FIG. 10.

In some aspects, the modified interference cleaning data may comprise a diagonal matrix, and the modified interference cleaning data may be identified by nulling off-diagonal elements of a noise covariance matrix from which the interference cleaning data is identified, where the noise covariance matrix may be estimated from the at least one pilot resource, as described in connection with the examples in FIGS. 4, 5, and 6.

Additionally, the at least one pilot resource may comprise a demodulation reference signal (DMRS), as described in connection with the examples in FIGS. 4, 5, and 6. The modified interference cleaning data may comprise a matrix resulting from an inverse of $R_{nn}^{diag}$, where $R_{nn}^{diag}$ is a result of zeroing off-diagonal elements of a $R_{nn}$ matrix, as described in connection with the examples in FIGS. 4, 5, and 6. Further, the $R_{nn}$ matrix may be a noise covariance matrix estimated from the DMRS, as described in connection with the examples in FIGS. 4, 5, and 6.

In some instances, the at least one data resource may comprise information on a physical uplink shared channel (PUSCH), as described in connection with the examples in FIGS. 4, 5, and 6. Also, the UE and/or the base station may be in a serving cell, and the first interference and the second interference may be from a neighbor cell, as described in connection with the examples in FIGS. 4, 5, and 6. The at least one pilot resource may comprise a first pilot resource from the serving cell, and the first pilot resource may be received in a different symbol than a second pilot resource from the neighbor cell, as described in connection with the examples in FIGS. 4, 5, and 6.

Figure 9:
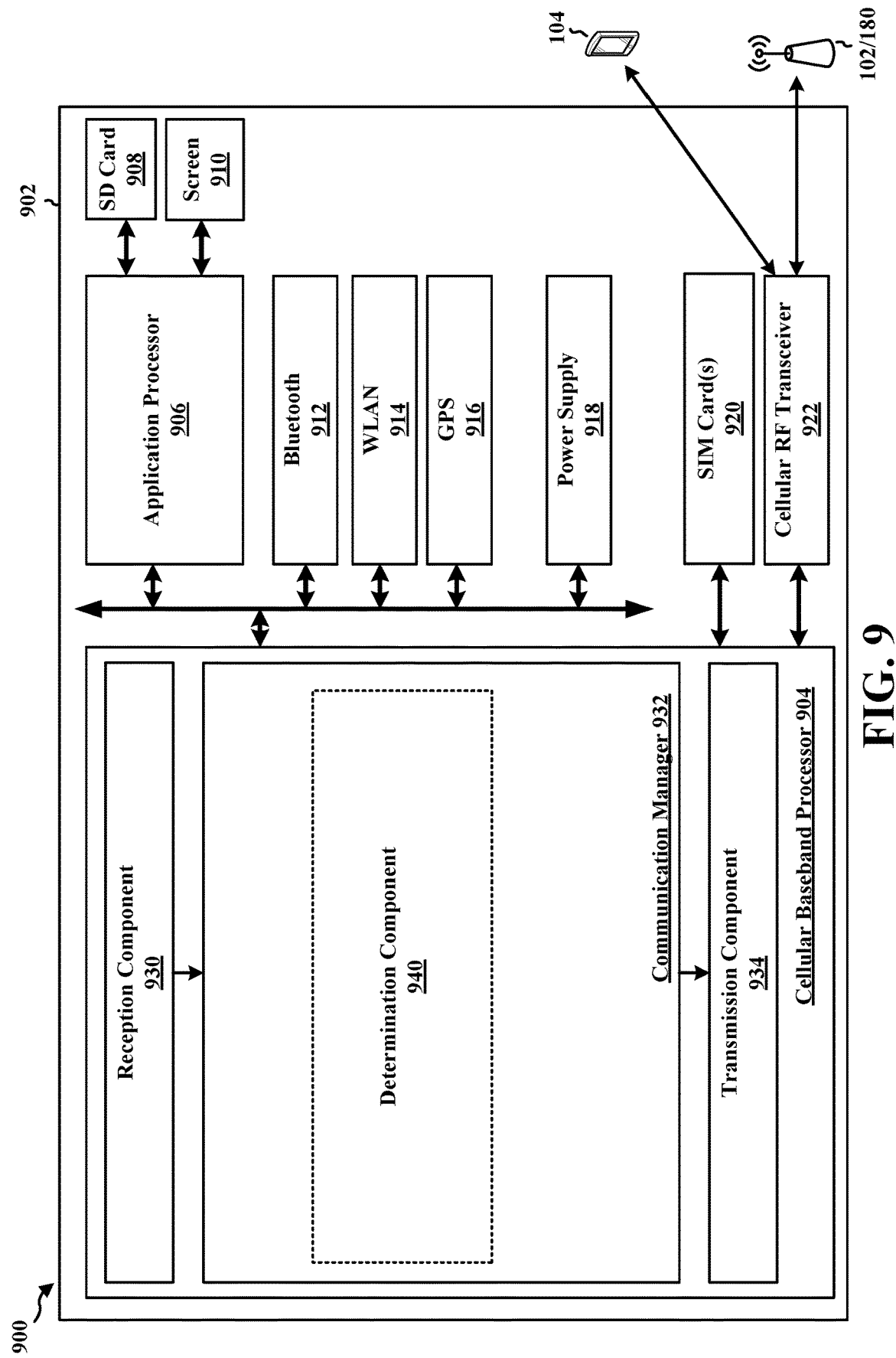
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/ memory. The computer-readable medium/memory may be non-transitory. The cellular baseband processor 904 is responsible for general processing, including the execution of software stored on the computer-readable medium/ memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a determination component 940 that is configured to receive at least one pilot resource and at least one data resource from a base station, e.g., as described in connection with step 702 in FIG. 7. Determination component 940 may be further configured to identify interference cleaning data for the at least one pilot resource, e.g., as described in connection with step 704 in FIG. 7. Determination component 940 may be further configured to determine whether a first interference affecting the at least one pilot resource is the same as a second interference affecting the at least one data resource, e.g., as described in connection with step 706 in FIG. 7. Determination component 940 may be further configured to identify a transmission power difference between the at least one pilot resource and the at least one data resource, e.g., as described in connection with step 708 in FIG. 7. Determination component 940 may be further configured to apply the interference cleaning data to the at least one data resource when the first interference is the same as the second interference, e.g., as described in connection with step 710 in FIG. 7. Determination component 940 may be further configured to apply modified interference cleaning data to the at least one data resource when the first interference is different than the second interference, e.g., as described in connection with step 712 in FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving at least one pilot resource and at least one data resource from a base station; means for identifying interference cleaning data for the at least one pilot resource; means for determining whether a first interference affecting the at least one pilot resource is the same as a second interference affecting the at least one data resource; means for applying the interference cleaning data to the at least one data resource when the first interference is the same as the second interference; means for applying modified interference cleaning data to the at least one data resource when the first interference is different than the second interference; and means for identifying a transmission power difference between the at least one pilot resource and the at least one data resource. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
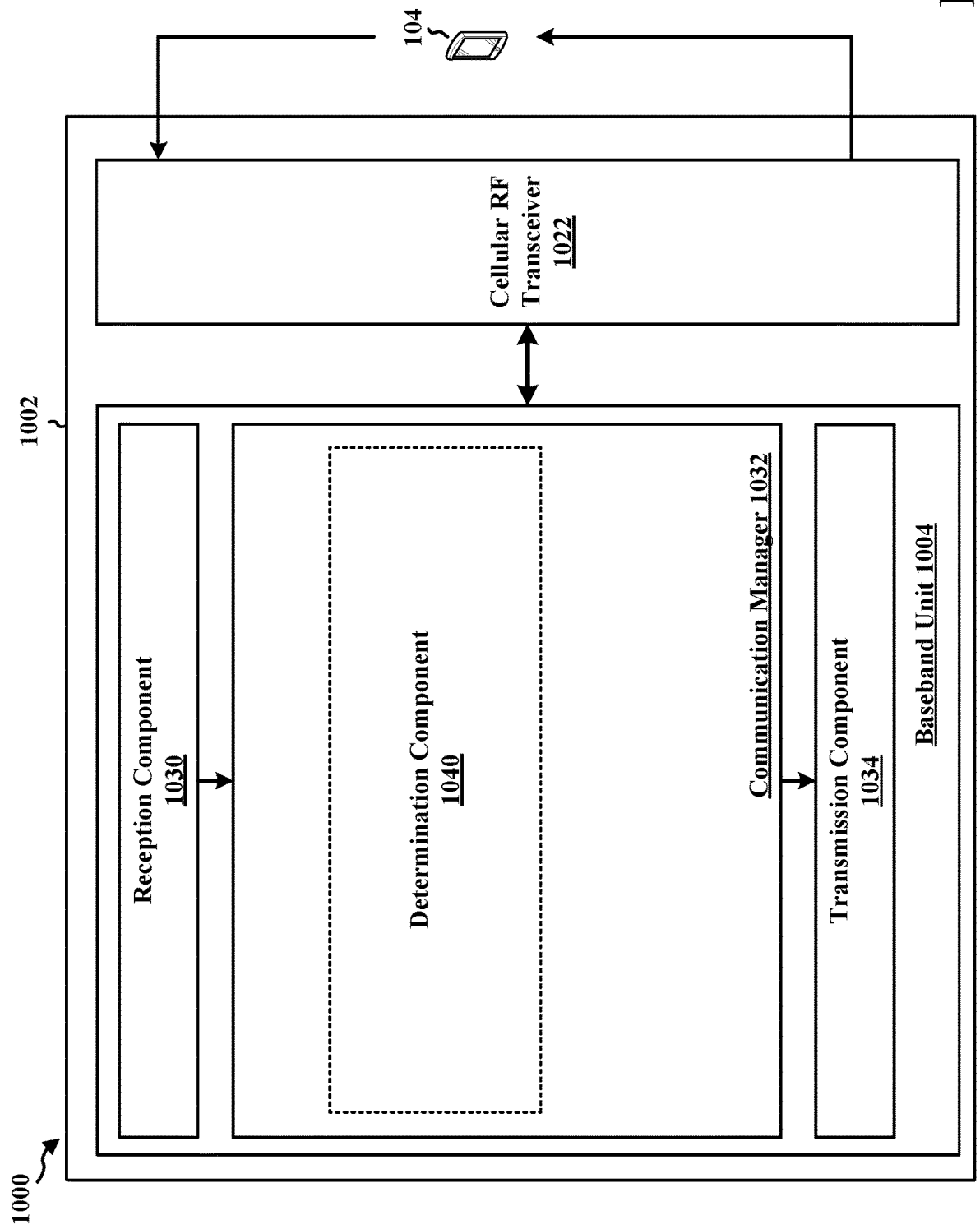
FIG. 10 is a diagram illustrating an example of a hardware implementation for an example apparatus.

FIG. 10 is a diagram 1000 illustrating an example of a hardware implementation for an apparatus 1002. The apparatus 1002 is a base station (BS) and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a determination component 1040 that is configured to receive at least one pilot resource and at least one data resource from a base station, e.g., as described in connection with step 802 in FIG. 8. Determination component 1040 may be further configured to identify interference cleaning data for the at least one pilot resource, e.g., as described in connection with step 804 in FIG. 8. Determination component 1040 may be further configured to determine whether a first interference affecting the at least one pilot resource is the same as a second interference affecting the at least one data resource, e.g., as described in connection with step 806 in FIG. 8. Determination component 1040 may be further configured to identify a transmission power difference between the at least one pilot resource and the at least one data resource, e.g., as described in connection with step 808 in FIG. 8. Determination component 1040 may be further configured to apply the interference cleaning data to the at least one data resource when the first interference is the same as the second interference, e.g., as described in connection with step 810 in FIG. 8. Determination component 1040 may be further configured to apply modified interference cleaning data to the at least one data resource when the first interference is different than the second interference, e.g., as described in connection with step 812 in FIG. 8.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving at least one pilot resource and at least one data resource from a base station; means for identifying interference cleaning data for the at least one pilot resource; means for determining whether a first interference affecting the at least one pilot resource is the same as a second interference affecting the at least one data resource; means for applying the interference cleaning data to the at least one data resource when the first interference is the same as the second interference; means for applying modified interference cleaning data to the at least one data resource when the first interference is different than the second interference; and means for identifying a transmission power difference between the at least one pilot resource and the at least one data resource. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, the present disclosure allows a UE to apply a modified whitening transform W' to account for differences in interference between pilots and data, thereby improving PDSCH decoding performance of the UE. For example, the UE may estimate a transmission power of the DMRS and data carried on one or more symbols of PDSCH, and determine whether the difference in transmission power is greater than a threshold power. Such power difference may advantageously allow a UE to determine whether the DMRS is affected by interference while the data is not, or vice-versa, since the base station may transmit a signal with greater power to compensate for the interference. Moreover, if the UE determines that the interference affecting a pilot is different than the interference affecting the data, the UE may modify the whitening transform W to account for the interference. For example, the UE may null the off-diagonal elements of W, thereby transforming W into a diagonal matrix W', and apply the modified matrix to whiten the data. Nulling of the off-diagonal elements, which generally represent significantly high energy elements, advantageously allows the UE to avoid enhancement of thermal noise and interference due to inaccurate estimation of W.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes receiving at least one pilot resource and at least one data resource from a base station; identifying interference cleaning data for the at least one pilot resource; determining whether a first interference affecting the at least one pilot resource is the same as a second interference affecting the at least one data resource; applying the interference cleaning data to the at least one data resource when the first interference is the same as the second interference; and applying modified interference cleaning data to the at least one data resource when the first interference is different than the second interference.

Aspect 2 is the method of aspect 1, where the interference cleaning data is a whitening transform matrix.

Aspect 3 is the method of any of aspects 1 and 2, where the determining whether a first interference affecting the at least one pilot resource is the same as a second interference affecting the at least one data resource further comprises identifying a transmission power difference between the at least one pilot resource and the at least one data resource; where the interference cleaning data is applied to the at least one data resource when the transmission power difference is less than a threshold power; and where the modified interference cleaning data is applied to the at least one data resource when the transmission power difference is greater than the threshold power, where the interference cleaning data or the modified interference cleaning data may also be applied at any other appropriate time, applied based on any other appropriate measurement, or applied with any other appropriate approach.

Aspect 4 is the method of any of aspects 1 to 3, where the modified interference cleaning data comprises a diagonal matrix, and the modified interference cleaning data is identified by nulling off-diagonal elements of a noise covariance matrix from which the interference cleaning data is identified, the noise covariance matrix being estimated from the at least one pilot resource, where the modified interference cleaning data may be identified by any other transform which is different than the original transform.

Aspect 5 is the method of any of aspects 1 to 4, where the at least one pilot resource comprises a demodulation reference signal (DMRS).

Aspect 6 is the method of any of aspects 1 to 5, where the modified interference cleaning data comprises a matrix resulting from an inverse of $R_{nn}^{diag}$, where $R_{nn}^{diag}$ is a result of zeroing off-diagonal elements of a $R_{nn}$ matrix; where the $R_{nn}$ matrix is a noise covariance matrix estimated from the DMRS.

Aspect 7 is the method of any of aspects 1 to 6, where the at least one data resource comprises information on a physical downlink shared channel (PDSCH).

Aspect 8 is the method of any of aspects 1 to 7, where the base station is in a serving cell, and where the first interference and the second interference are from a neighbor cell.

Aspect 9 is the method of any of aspects 1 to 8, where the at least one pilot resource comprises a first pilot resource from the serving cell, and the first pilot resource is received in a different symbol than a second pilot resource from the neighbor cell.

Aspect 10 is an apparatus for wireless communication including means for implementing a method as in any of aspects 1 to 9.

Aspect 11 is an apparatus for wireless communication including at least one processor coupled to a memory and configured to implement a method as in any of aspects 1 to 9.

Aspect 12 is a computer-readable medium storing computer executable code, where the code when executed by a processor causes the processor to implement a method as in any of aspects 1 to 9.

Aspect 13 is a method of wireless communication of a base station. The method includes receiving at least one pilot resource and at least one data resource from a UE; identifying interference cleaning data for the at least one pilot resource; determining whether a first interference affecting the at least one pilot resource is the same as a second interference affecting the at least one data resource; applying the interference cleaning data to the at least one data resource when the first interference is the same as the second interference; and applying modified interference cleaning data to the at least one data resource when the first interference is different than the second interference.

Aspect 14 is the method of aspect 13, where the interference cleaning data is a whitening transform matrix.

Aspect 15 is the method of any of aspects 13 and 14, where the determining whether a first interference affecting the at least one pilot resource is the same as a second interference affecting the at least one data resource further comprises identifying a transmission power difference between the at least one pilot resource and the at least one data resource; where the interference cleaning data is applied to the at least one data resource when the transmission power difference is less than a threshold power; and where the modified interference cleaning data is applied to the at least one data resource when the transmission power difference is greater than the threshold power.

Aspect 16 is the method of any of aspects 13 to 15, where the modified interference cleaning data comprises a diagonal matrix, and the modified interference cleaning data is identified by nulling off-diagonal elements of a noise covariance matrix from which the interference cleaning data is identified, the noise covariance matrix being estimated from the at least one pilot resource.

Aspect 17 is the method of any of aspects 13 to 16, where the at least one pilot resource comprises a demodulation reference signal (DMRS).

Aspect 18 is the method of any of aspects 13 to 17, where the modified interference cleaning data comprises a matrix resulting from an inverse of $R_{nn}^{diag}$, where $R_{nn}^{diag}$ is a result of zeroing off-diagonal elements of a $R_{nn}$ matrix; where the $R_{nn}$ matrix is a noise covariance matrix estimated from the DMRS.

Aspect 19 is the method of any of aspects 13 to 18, where the at least one data resource comprises information on a physical uplink shared channel (PUSCH).

Aspect 20 is the method of any of aspects 13 to 19, where the UE is in a serving cell, and where the first interference and the second interference are from a neighbor cell.

Aspect 21 is the method of any of aspects 13 to 20, where the at least one pilot resource comprises a first pilot resource from the serving cell, and the first pilot resource is received in a different symbol than a second pilot resource from the neighbor cell.

Aspect 22 is an apparatus for wireless communication including means for implementing a method as in any of aspects 13 to 21.

Aspect 23 is an apparatus for wireless communication including at least one processor coupled to a memory and configured to implement a method as in any of aspects 13 to 21.

Aspect 24 is a computer-readable medium storing computer executable code, where the code when executed by a processor causes the processor to implement a method as in any of aspects 13 to 21.

What is claimed is:

1. A method of wireless communication of a user equipment (UE), comprising:
   receiving at least one pilot resource and at least one data resource from a base station;
   identifying interference cleaning data for the at least one pilot resource;
   determining whether a first interference affecting the at least one pilot resource is a same interference as a second interference affecting the at least one data resource based on identifying a transmission power difference between the at least one pilot resource and the at least one data resource;
   applying the interference cleaning data to the at least one data resource when the first interference is the same interference as the second interference, the interference cleaning data being applied to the at least one data resource when the transmission power difference is less than a threshold power; and
   applying modified interference cleaning data to the at least one data resource when the first interference is different than the second interference, the modified interference cleaning data being applied to the at least one data resource when the transmission power difference is greater than the threshold power.

2. The method of claim 1, wherein the interference cleaning data is a whitening transform matrix.

3. The method of claim 1, wherein the modified interference cleaning data comprises a diagonal matrix, and the modified interference cleaning data is identified by nulling off-diagonal elements of a noise covariance matrix from which the interference cleaning data is identified, the noise covariance matrix being estimated from the at least one pilot resource.

4. The method of claim 1, wherein the at least one pilot resource comprises a demodulation reference signal (DMRS).

5. The method of claim 4, wherein the modified interference cleaning data comprises a matrix resulting from an inverse of $R_{nn}^{diag}$ wherein $R_{nn}^{diag}$ is a result of zeroing off-diagonal elements of a $R_{nn}$ matrix; and
   wherein the $R_{nn}$ matrix is a noise covariance matrix estimated from the DMRS.

6. The method of claim 1, wherein the at least one data resource comprises information on a physical downlink shared channel (PDSCH).

7. The method of claim 1, wherein the base station is in a serving cell, and wherein the first interference and the second interference are from a neighbor cell.

8. The method of claim 7, wherein the at least one pilot resource comprises a first pilot resource from the serving cell, and the first pilot resource is received in a different symbol than a second pilot resource from the neighbor cell.

9. An apparatus for wireless communication of a user equipment (UE), comprising:
   a memory; and
   at least one processor coupled to the memory and configured to:
     receive at least one pilot resource and at least one data resource from a base station;
     identify interference cleaning data for the at least one pilot resource;
     determine whether a first interference affecting the at least one pilot resource is a same interference as a second interference affecting the at least one data resource based on identifying a transmission power difference between the at least one pilot resource and the at least one data resource;
     apply the interference cleaning data to the at least one data resource when the first interference is the same interference as the second interference, the interference cleaning data being applied to the at least one data resource when the transmission power difference is less than a threshold power; and
     apply modified interference cleaning data to the at least one data resource when the first interference is different than the second interference, the modified interference cleaning data being applied to the at least one data resource when the transmission power difference is greater than the threshold power.

10. The apparatus of claim 9, wherein the interference cleaning data is a whitening transform matrix.

11. The apparatus of claim 9, wherein the modified interference cleaning data comprises a diagonal matrix, and the modified interference cleaning data is identified by nulling off-diagonal elements of a noise covariance matrix from which the interference cleaning data is identified, the noise covariance matrix being estimated from the at least one pilot resource.

12. The apparatus of claim 9, wherein the at least one pilot resource comprises a demodulation reference signal (DMRS).

13. The apparatus of claim 12, wherein the modified interference cleaning data comprises a matrix resulting from an inverse of $R^{diag}_{nn}$ wherein $R^{diag}_{nn}$ is a result of zeroing off-diagonal elements of a $R_{nn}$ matrix; and
wherein the $R_{nn}$ matrix is a noise covariance matrix estimated from the DMRS.

14. A method of wireless communication of a base station, comprising:
receiving at least one pilot resource and at least one data resource from a user equipment (UP;
identifying interference cleaning data for the at least one pilot resource;
determining whether a first interference affecting the at least one pilot resource is a same interference as a second interference affecting the at least one data resource based on identifying a transmission power difference between the at least one pilot resource and the at least one data resource;
applying the interference cleaning data to the at least one data resource when the first interference is the same interference as the second interference, the interference cleaning data being applied to the at least one data resource when the transmission power difference is less than a threshold power; and
applying modified interference cleaning data to the at least one data resource when the first interference is different than the second interference, the modified interference cleaning data being applied to the at least one data resource when the transmission power difference is greater than the threshold power.

15. The method of claim 14, wherein the interference cleaning data is a whitening transform matrix.

16. The method of claim 14, wherein the modified interference cleaning data comprises a diagonal matrix, and the modified interference cleaning data is identified by nulling off-diagonal elements of a noise covariance matrix from which the interference cleaning data is identified, the noise covariance matrix being estimated from the at least one pilot resource.

17. The method of claim 14, wherein the at least one pilot resource comprises a demodulation reference signal (DMRS).

18. The method of claim 17, wherein the modified interference cleaning data comprises a matrix resulting from an inverse of $R^{diag}_{nn}$, wherein $R^{diag}_{nn}$ is a result of zeroing off-diagonal elements of a $R_{nn}$ matrix; and
wherein the $R_{nn}$ matrix is a noise covariance matrix estimated from the DMRS.

19. The method of claim 14, wherein the at least one data resource comprises information on a physical uplink shared channel (PUSCH).

20. The method of claim 14, wherein the UE is in a serving cell, and wherein the first interference and the second interference are from a neighbor cell.

21. The method of claim 20, wherein the at least one pilot resource comprises a first pilot resource from the serving cell, and the first pilot resource is received in a different symbol than a second pilot resource from the neighbor cell.

22. An apparatus for wireless communication of a base station, comprising:
a memory; and
at least one processor coupled to the memory and configured to:
receive at least one pilot resource and at least one data resource from a user equipment (UE);
identify interference cleaning data for the at least one pilot resource;
determine whether a first interference affecting the at least one pilot resource is a same interference as a second interference affecting the at least one data resource based on identifying a transmission power difference between the at least one pilot resource and the at least one data resource;
apply the interference cleaning data to the at least one data resource when the first interference is the same interference as the second interference, the interference cleaning data being applied to the at least one data resource when the transmission power difference is less than a threshold power; and
apply modified interference cleaning data to the at least one data resource when the first interference is different than the second interference, the modified interference cleaning data being applied to the at least one data resource when the transmission power difference is greater than the threshold power.

23. The apparatus of claim 22, wherein the interference cleaning data is a whitening transform matrix.

24. The apparatus of claim 22, wherein the modified interference cleaning data comprises a diagonal matrix, and the modified interference cleaning data is identified by nulling off-diagonal elements of a noise covariance matrix from which the interference cleaning data is identified, the noise covariance matrix being estimated from the at least one pilot resource.

25. The apparatus of claim 22, wherein the at least one pilot resource comprises a demodulation reference signal (DMRS).

26. The apparatus of claim 25, wherein the modified interference cleaning data comprises a matrix resulting from an inverse of $R^{diag}_{nn}$ wherein $R^{diag}_{nn}$ is a result of zeroing off-diagonal elements of a $R_{nn}$ matrix; and
wherein the $R_{nn}$ matrix is a noise covariance matrix estimated from the DMRS.

* * * * *